United States Patent [19]
Murphree

[11] 3,976,312
[45] Aug. 24, 1976

[54] EXPANSION JOINT
[75] Inventor: Burleigh R. Murphree, Houston, Tex.
[73] Assignee: Peabody Dore' Corporation, Fort Bend County, Tex.
[22] Filed: Aug. 22, 1975
[21] Appl. No.: 606,900

[52] U.S. Cl. .................................. 285/45; 285/93; 285/226
[51] Int. Cl.² ......................................... F16L 11/12
[58] Field of Search ............... 285/114, 93, 45, 226; 138/104, 114, 121

[56] References Cited
UNITED STATES PATENTS

| | | | |
|---|---|---|---|
| 3,299,417 | 1/1967 | Sibthorpe | 285/226 |
| 3,527,479 | 9/1970 | Matthiessen | 285/45 |
| 3,594,021 | 7/1971 | Williams | 285/43 |
| 3,655,224 | 4/1972 | Carberry et al. | 285/226 |

*Primary Examiner*—Dave W. Arola
*Attorney, Agent, or Firm*—Fulbright & Jaworski

[57] ABSTRACT

An expansion joint having a first corrugated tubular member including a plurality of ridges and valleys and having connections at each end for connection in a conduit in which a protective member including a second corrugated tubular member is sized to encircle the exterior of the first tubular member and includes a plurality of ridges and valleys mating with the ridges and valleys of the first member. The second protective tubular member receives any material flowing through a leak in the first member and prevent spraying of the material to the surroundings. The second member is flexible for moving with the first member and preferably the second member is transparent whereby leaks in the first member may be visually observed.

1 Claim, 1 Drawing Figure

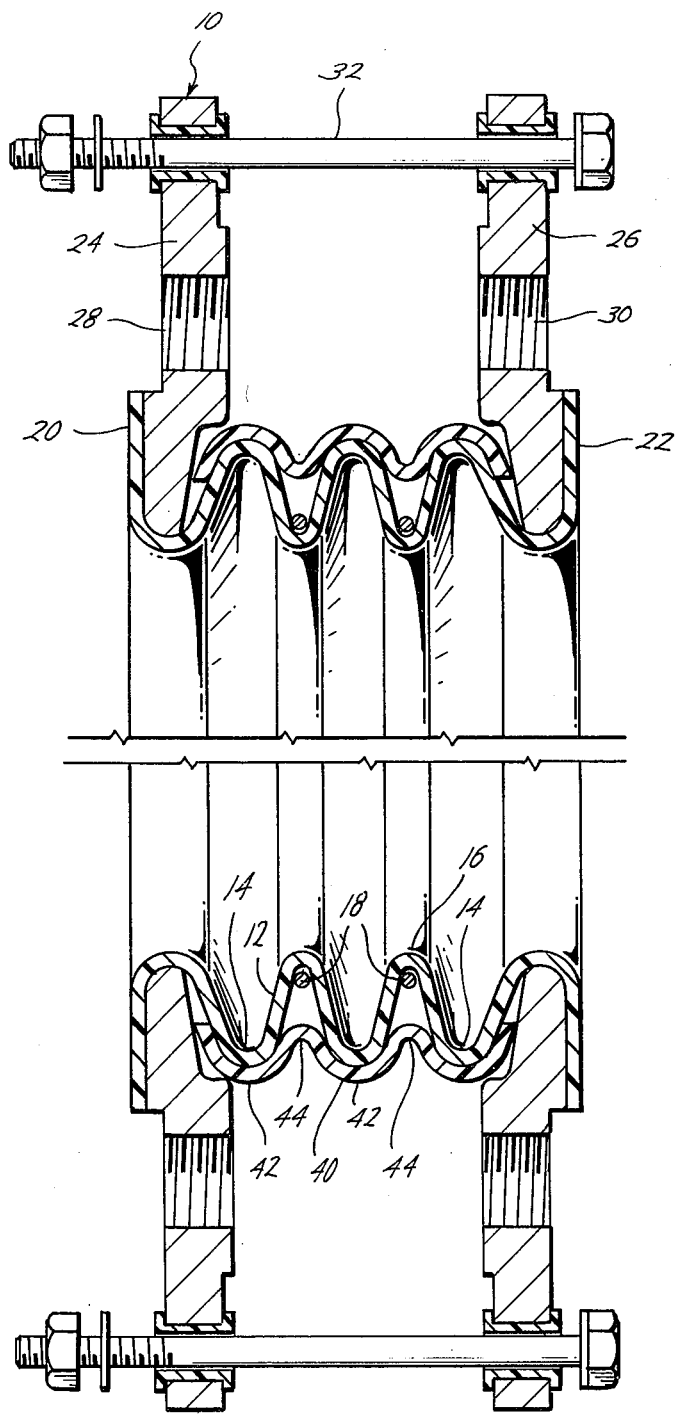

EXPANSION JOINT

BACKGROUND OF THE INVENTION

Generally, it is old to provide an expansion joint having a tubular corrugated member which is used in piping systems to compensate for thermal growth, misalignment or vibration in the piping systems. However, such expansion joints sometimes fail and most failures occur at the ridges of the corrugated member and allow the material inside of the expansion joint to squirt or spray in whatever direction the crack occurs. Such leaks become especially hazardous in chemical plants in which the piping systems contain hot acids or materials that are harmful to personnel.

The present invention is directed to an improved expansion joint which is provided with a protective sleeve which does not interfere with the operation of the expansion joint but which reduces the danger from leaks occurring in the expansion joint.

SUMMARY

The present invention is directed to providing an expansion joint sleeve for encircling a corrugated expansion joint which has a plurality of ridges and valleys by providing a protective tubular corrugated sleeve sized to encircle a corrugated expansion joint to trap any material flowing through a leak in the expansion joint and prevent spraying of the materials to the surroundings, and in which the sleeve is flexible so as to freely move with the expansion joint. Preferably, the protective sleeve is transparent whereby leaks in the expansion joint may be visually observed.

A still further object is the provision of an expansion joint which includes a first corrugated tubular member which has a plurality of ridges and valleys and has connections at each end for connection in a conduit in which a second corrugated tubular member is sized to encircle the exterior of the first tubular member and has a plurality of ridges and valleys mating with the ridges and valleys of the first member thereby receiving any material flowing through a leak in the first member. The second member is flexible for moving with the first member. Preferably, the second member covers all of the ridges of the first member thereby covering the locations of the first member at which failures are most likely to occur.

Other and further features and advantages will be readily apparent from the following description of a preferred embodiment of the invention.

DESCRIPTION OF THE DRAWING

The DRAWING is an elevational view, partly in cross section, illustrating the apparatus of the present invention.

DESCRIPTION OF THE PREFERRED EMBODIMENT

Referring now to the drawing, an expansion joint, generally indicated by the reference numeral 10, is shown which generally includes a first corrugated tubular member 12 which includes a plurality of ridges 14 and valleys 16 and may include stainless steel reinforcing rings 18 for added strength. While the corrugated member 12 may be of any suitable material, such as polytetrafluorethylene sold under the trademark Teflon, is particularly satisfactory.

The tubular member 12 includes first end 20 and and second end 22 which are connected respectfully to end connections or connecting flanges 24 and 26, respectively, which in turn include openings 28 and 30, respectively, for connecting the expansion joint 10 between two conduits or pipes (not shown). The connecting members 24 and 26 are suitably connected to flanges on the ends of the pipes by bolts extending through the openings 28 and 30, respectively. In addition, the expansion joint 10 may include limit bolts 32 which slidably extend through the end connections 24 and 26 for limiting their longitudinal extent of travel for insuring that the expansion tubular member 12 is not excessively expanded.

The above-named description of the expansion joint is generally old. Such expansion joints are used in piping systems to compensate for thermal growth, misalignment and vibration in the piping systems. However, the expansion joint 10 will sometimes fail and generally those failures occur at the ridges 14 of the corrugated tubular member 12. Such leaks on the ridges 14 eventually open up and allow the material inside of the expansion joint 10 to squirt or spray in random directions. This is especially hazardous in piping systems having hot acids or materials that are harmful to personnel.

The present invention is directed to an improved expansion joint by providing a protective second corrugated tubular member 40 which is sized to encircle the exterior of the first tubular member 12 and which includes a plurality of ridges 42 and valleys 44 which preferably mate with the ridges 14 and valleys 16 of the first member 12. The second corrugated tubular member 40 is for the purpose of protecting surrounding personnel and equipment from failures that may occur in the first member 12. With the corrugated member 40 on the outside of the member 12, the member 40 will contain erratic and random streams of spray escaping from a failure in the tubular member 12. A failure that occurs in the member 12 will leak material into the area between the exterior of the member 12 and the interior of the member 40 and the leaking material would be forced to travel to an end of the protective sleeve 40 and run out against the connecting flanges 24 or 26 and drip in a definite area. Preferably, the second member or protective sleeve 40 consists of a clear plastic material which will allow personnel to see in advance any failures that might be occurring or any very small leaks that may be beginning to appear in the tubular member 12. This would possibly give personnel ample time to shut down and make necessary repairs before considerable damage occurs. While any suitable material may be used, one satisfactory material for the member 40 is a thermoplastic type polytetrafluoroethylene.

The protective sleeve 40 in addition to protecting the surroundings from failures in tubular member 12, because of its corrugated configuration, is flexible and will move with the first member 12 and does not limit the action of the expansion joint 10 from performing its normal function of expanding and contracting. That is, since the valleys and ridges of the second member 40 coact and mate with the valleys and ridges of the first member 12, the second member 40 may move with, but yet not interfere with the operation of expansion and contraction of the first member 12. Preferably, the second member 40 covers all of the ridges 14 of the first member 12, thereby covering the locations of the first member 12 at which failures are most likely to occur.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit and scope of the invention and the scope of the appended claims.

What is claimed is:

1. An expansion joint comprising,
   a first flexible corrugated tubular member including a plurality of ridges and valleys and having connecting means at each end for connection to conduits,
   a second flexible corrugated tubular member sized to encircle the exterior of the first tubular member and having a plurality of ridges and valleys mating with the ridges and valleys of the first member,
   said second tubular member being shorter than the first member and having its ends open and being supported by the first member whereby said second member may accommodate movement of the first member but is not directly subjected to conduit movement, and whereby leaks in the first member is deflected by the second member out of the open ends of the second member, and
   said second member is transparent whereby leaks in the first member may be visually observed.

* * * * *